US008107766B2

(12) United States Patent
Kacher et al.

(10) Patent No.: US 8,107,766 B2
(45) Date of Patent: Jan. 31, 2012

(54) METHOD AND SYSTEM FOR STRAIGHTENING OUT DISTORTED TEXT-LINES ON IMAGES

(75) Inventors: Olga Kacher, Moscow region (RU); Vladimir Rybkin, Moscow (RU)

(73) Assignee: Abbyy Software Ltd., Nicosia (CY)

( * ) Notice: Subject to any disclaimer, the term of this patent is extended or adjusted under 35 U.S.C. 154(b) by 972 days.

(21) Appl. No.: 12/062,179

(22) Filed: Apr. 3, 2008

(65) Prior Publication Data

US 2009/0252439 A1    Oct. 8, 2009

(51) Int. Cl.
*G06K 9/40* (2006.01)
*G06K 9/32* (2006.01)
(52) U.S. Cl. .................................. 382/275; 382/293
(58) Field of Classification Search .................. 382/274, 382/275, 285, 287, 289, 290, 296, 173, 174, 382/317, 300; 358/1.9, 3.26, 452, 474, 488, 358/497, 504
See application file for complete search history.

(56) References Cited

U.S. PATENT DOCUMENTS

| | | | |
|---|---|---|---|
| 5,751,461 A | 5/1998 | Chen et al. | |
| 5,848,197 A * | 12/1998 | Ebihara | 382/275 |
| 6,665,128 B1 | 12/2003 | Tai | |
| 6,996,290 B2 * | 2/2006 | Cariffe | 382/275 |
| 7,016,081 B2 * | 3/2006 | Araki et al. | 358/3.26 |
| 7,072,527 B1 | 7/2006 | Nako | |
| 7,170,644 B2 | 1/2007 | Loce et al. | |
| 7,215,445 B2 | 5/2007 | Braudaway et al. | |
| 7,417,765 B2 * | 8/2008 | Araki | 358/1.9 |
| 7,477,426 B2 * | 1/2009 | Guan et al. | 358/474 |
| 2005/0225808 A1 * | 10/2005 | Braudaway et al. | 358/3.26 |

OTHER PUBLICATIONS

Faisal, Shafait et al., "Document Image Dewarping Contest", 2nd Int. Workshop on Camera-Based Document Analysis and Recognition (CBDAR),(2007).
Zhang, L et al., "Restoring Warped Document Images through 3D Shape Modeling", 28, 2 (Feb. 2006). 195-208, IEEE Trans. Pattern Anal. Mach. Intell.,(2006).

* cited by examiner

*Primary Examiner* — Yon Couso
(74) *Attorney, Agent, or Firm* — John C. Meline

(57) ABSTRACT

In one embodiment, a method for correcting distortions in a scanned image of a page is disclosed. The method comprises identifying at least one set of collinear elements in the scanned image; and generating a corrected image based on the scanned image including for at least some of the collinear elements in each set applying a spatial location correction to position all collinear elements in the set on a common horizontal rectilinear base line in the corrected image.

10 Claims, 7 Drawing Sheets

METHOD AND SYSTEM FOR STRAIGHTENING OUT DISTORTED TEXT-LINES ON IMAGES

FIELD

Embodiments of the present invention relate to a method and system for Optical Character Recognition (OCR).

BACKGROUND

OCR is a technology that enables conversion of scanned or photographed images of typewritten text into machine-editable and searchable text.

Scanning or photographing a document page from a thick bound volume often results in different distortions on the image, e.g. distorted text-lines in the area of the spine of the book. FIG. 1 shows a scanned image corresponding to a page of a book. It will be seen that the area indicated by reference numeral 101 contains some geometric distortion or warping.

This distortion may be caused by book pages not being in uniform intimate contact with the scanning surface or platen surface of a scanner. For example, portions of book pages that are near the spine of the book are usually the portions that are not in intimate contact with the platen surface. Accordingly, distortion occurs in image parts corresponding to these portions. These distortions prevent the correct recognition of words located in close proximity to the binding edge of a book.

SUMMARY

The present invention corrects distortions on images obtained from scanners or cameras, including those integrated into mobile devices. Advantageously, embodiments of the present invention straighten out text-lines in scanned images and thereby considerably improve the quality of OCR.

BRIEF DESCRIPTION OF THE DRAWINGS

FIGS. 4A-4C illustrates the steps in the method for correcting a distorted image, in accordance with one embodiment of the invention

DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
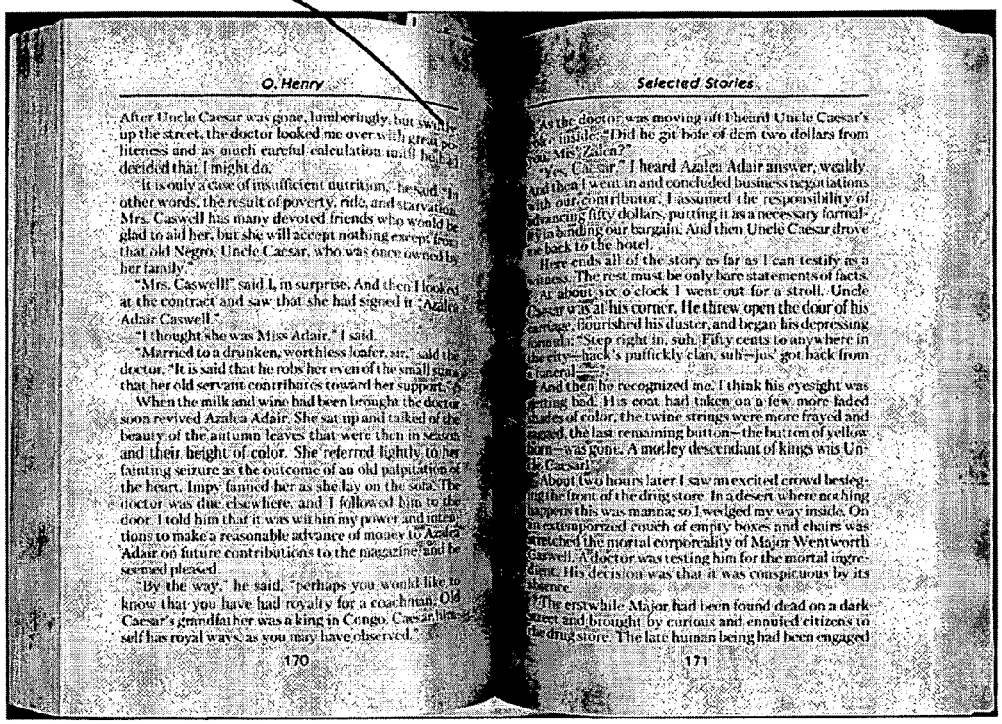
FIG. 1 is a photographed image of a book page with the usual distortions at the binding edge (101).
Figure 2:
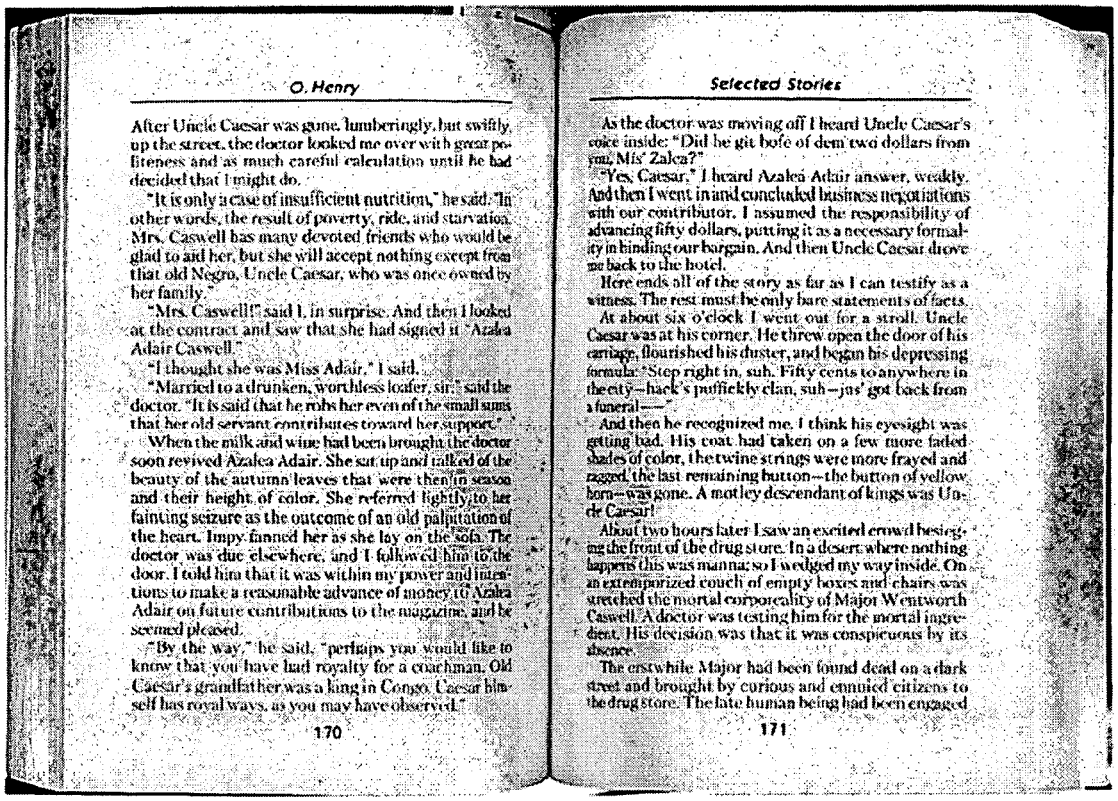
FIG. 2 is an image obtained from the image in FIG. 1 by applying the proposed method for straightening out distorted text-lines. The distortions at the binding edge have been corrected.

In one embodiment, the invention discloses a method for correcting distortions in a scanned image ("distorted image") of a page. By way of example, FIG. 1 of the drawings shows a distorted image corresponding to a page of a book, wherein distortions can be seen in the area indicated by reference 101. The distortions manifest as distorted text-lines and are caused due to portions of a page near the spine of a book not being intimate contact with a platen surface of a scanner used to scan the page. In accordance with the method, a new or corrected image is created onto which dots from the distorted image are then transferred in such a way as to straighten out the distorted text-lines. FIG. 2 shows a corrected image based on the image of FIG. 1 and which was generated in accordance with the techniques of the present invention.

Figure 3:
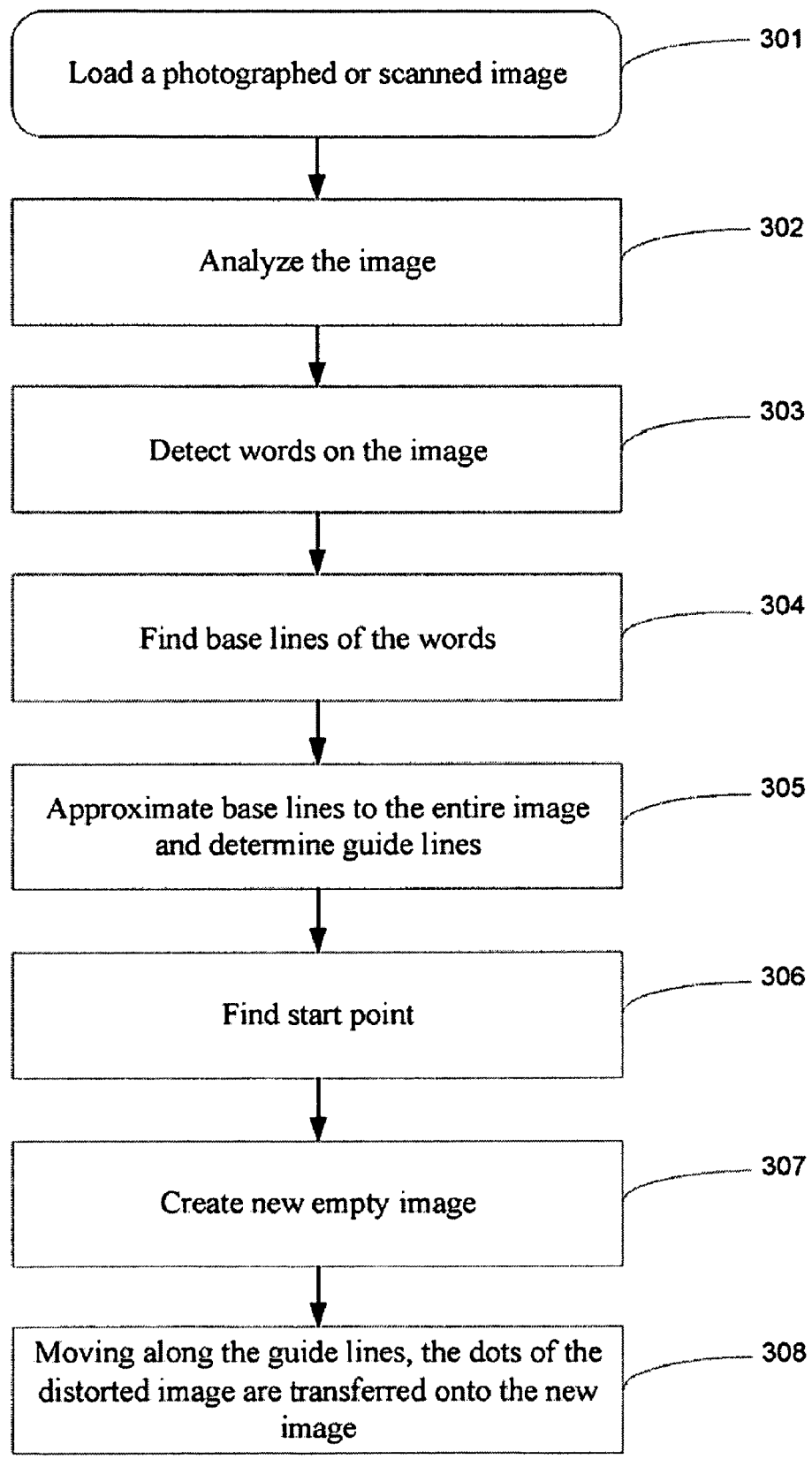
FIG. 3 shows a flowchart of the method for correcting a distorted image, in accordance with one embodiment of the invention.

Turning now to FIG. 3 of the drawings there is shown a flowchart of the method for correcting distortions, in accordance with one embodiment of the invention. At 301, a scanned or photographed image of a book page is fed into a system, which in one embodiment may be a general purpose computer (system) modified by software to perform the method for correcting distortions of the present invention. An example of such a system is described with reference to FIG. 5 of the drawings later. The image of FIG. 1 serves as an example of a photographed image.

Figure 4A:
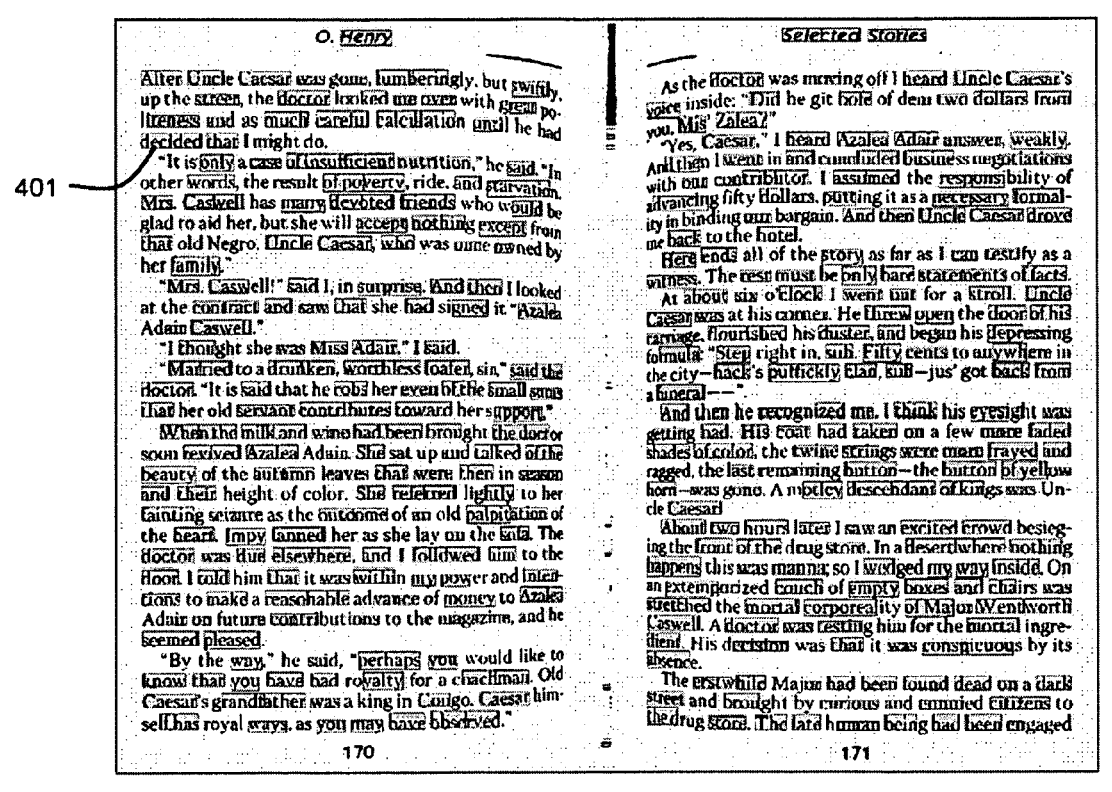

First, the system identifies at least one set of collinear elements in the scanned image. In the case of the image of FIG. 1, the collinear elements are words on a given line of text. It will be seen that the image of FIG. 1 includes multiple sets of words corresponding to each line of text. The system identifies these multiple sets of words by analyzing the image 302 and detects possible objects based on the mutual arrangement of the black and white dots. On a book page image, these objects are primarily letters, which are subsequently, if possible, separated into words (303). The method of U.S. Pat. No. 7,088,873 may be used to analyze the image. FIG. 4A shows the words (401) detected on the image shown in FIG. 1.

Figure 4B:
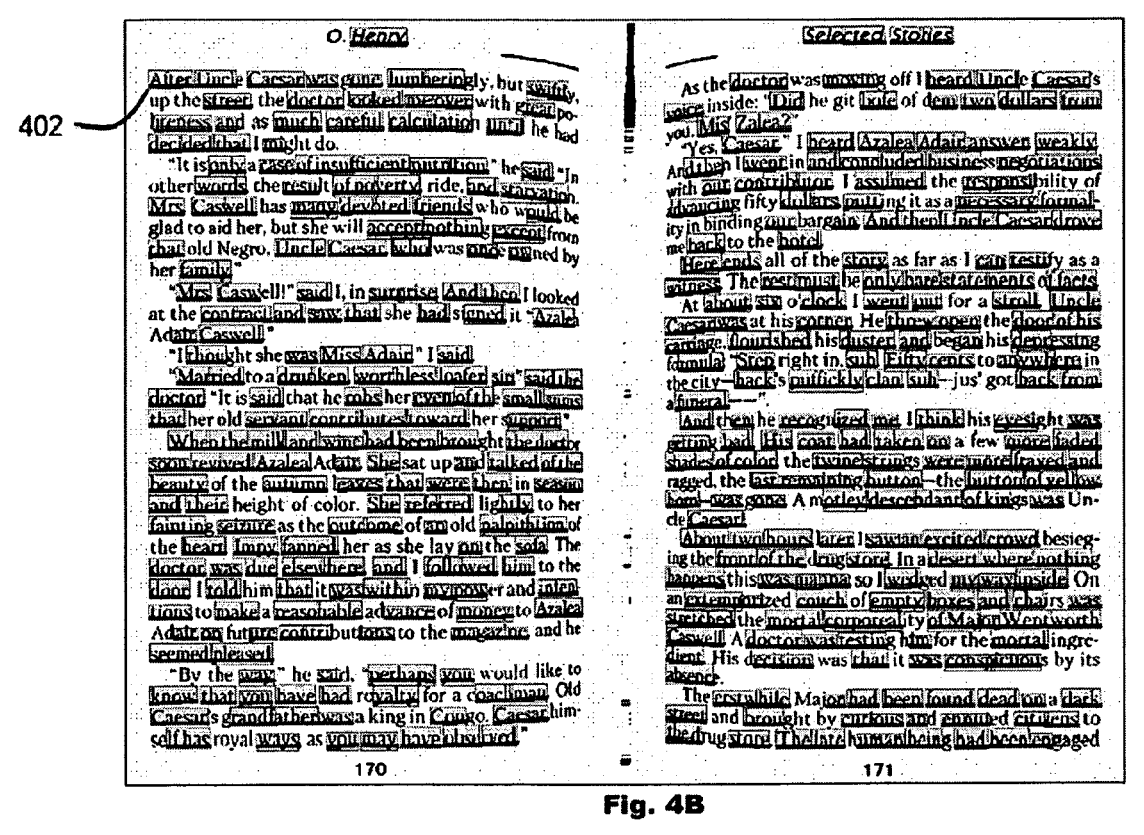
Figure 4C:
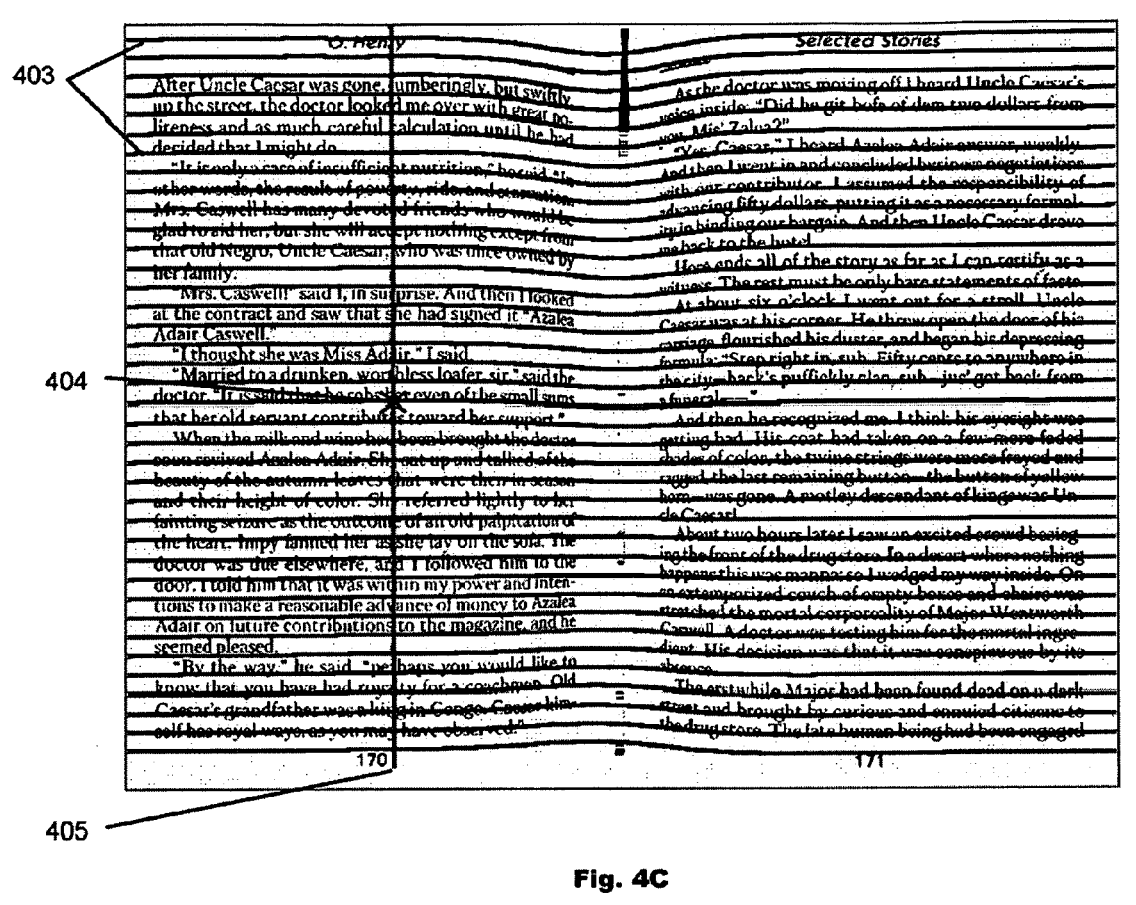

Next, the system generates a corrected image based on the image 302 including for at least some of the collinear elements (words) in each set applying a spatial location collection to position all collinear elements (words) in the set on a common horizontal rectilinear base line in the corrected image. Generating the corrected image involves several steps which will now be described. For each detected word or part of a word its base line is detected (304). A base line (402) is the line on which the letters of the given word are located. FIG. 4B shows base lines of the words detected on the image. Then the detected base lines are approximated for the entire image in order to obtain common base lines or guide lines (305). All words on a common base line are part of the same set. Thus, the guide lines (403) are the lines that describe the surface of the distorted image. In one embodiment, a point is detected starting from which the dots on the distorted image will be transferred onto the new image (306). This point lies outside the distorted area, i.e. in the part of the image where the guide lines are horizontal. In order to detect the start point, the system finds a vertical line such that it is perpendicular to the maximum number of guide lines and is closest to the binding edge of the book (405). The middle of this vertical line serves as the start point (404) which is also referred to as the "first start point".

At the next step, an empty image is created and straight horizontal guide lines and the start point (307), which is also referred to as the "second start point" are marked on the image. In one embodiment, starting from the start points on the two images and moving synchronously leftward and rightward along the distorted guidelines of the source image and along the corresponding straight guide lines of the new image, the points on the new image are filled with the values of their corresponding points on the distorted image. Moving in this manner rightward and leftward along the guide lines, and downward and upward along the vertical line, the new image is populated with the dots of the distorted image. The text-lines on the new image are straight, as can be seen from FIG. 2 of the drawings.

Figure 5:
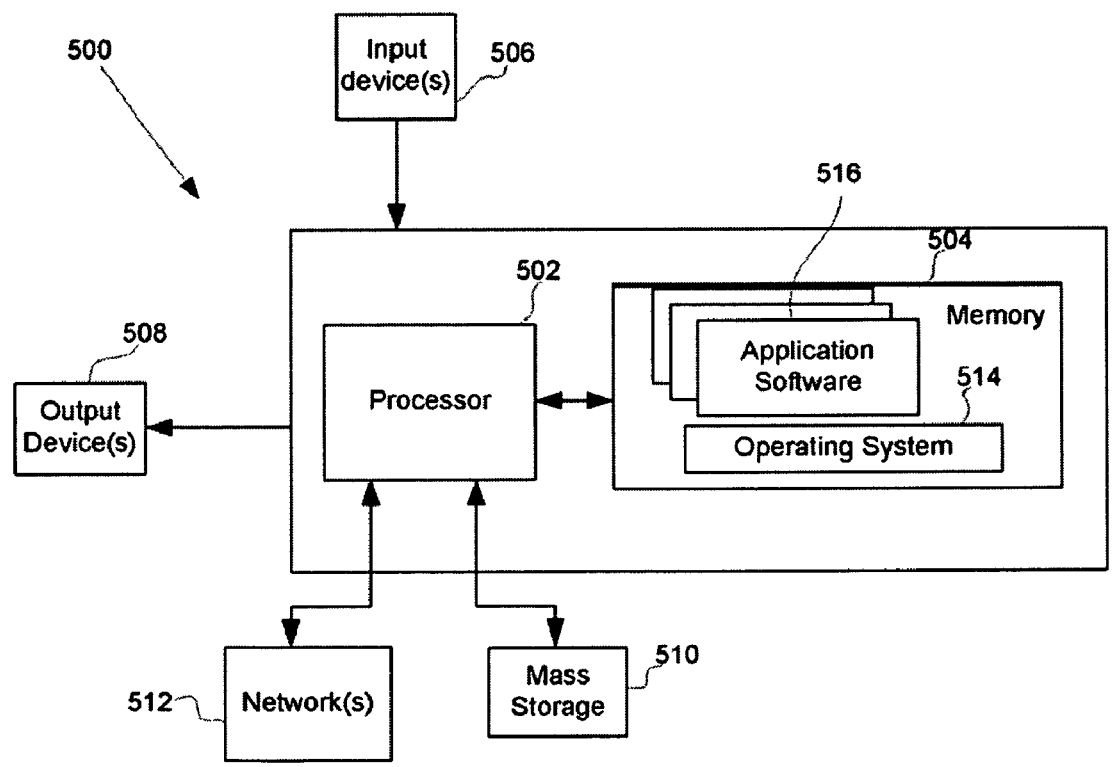
FIG. 5 shows a block diagram of the system, in accordance with one embodiment of the invention, for correcting a distorted image.

FIG. 5 of the drawings shows a system 500 for correcting a distorted image using the techniques described above, in accordance with one embodiment of the invention. The system 500 typically includes at least one processor 502 coupled to a memory 504. The processor 502 may represent one or more processors (e.g., microprocessors), and the memory 504 may represent random access memory (RAM) devices comprising a main storage of the system 500, as well as any supplemental levels of memory e.g., cache memories, non-volatile or back-up memories (e.g. programmable or flash memories), read-only memories, etc. In addition, the memory 504 may be considered to include memory storage physically located elsewhere in the system 500, e.g. any cache memory in the processor 502, as well as any storage capacity used as a virtual memory, e.g., as stored on a mass storage device 510.

The system 500 also typically receives a number of inputs and outputs for communicating information externally. For interface with a user or operator, the system 500 may include one or more user input devices 506 (e.g., a keyboard, a mouse, a scanner etc.) and a display 508 (e.g., a Liquid Crystal Display (LCD) panel). For additional storage, the hardware 500 may also include one or more mass storage devices 510, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the system 500 may include an interface with one or more networks 512 (e.g., a local area network (LAN), a wide area network (WAN), a wireless network, and/or the Internet among others) to permit the communication of information with other computers coupled to the networks. It should be appreciated that the system 500 typically includes suitable analog and/or digital interfaces between the processor 502 and each of the components 504, 506, 508 and 512 as is well known in the art.

The system 500 operates under the control of an operating system 514, and executes various computer software applications, components, programs, objects, modules, etc. indicated collectively by reference numeral 516 to perform the correction techniques described above In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A method for correcting distortions in a scanned image of a page, the method comprising:
   detecting one or more areas of distortion in the scanned image of the page;
   identifying at least one set of collinear elements outside of the one or more areas of distortion in each of a plurality of lines in the scanned image;
   from the collinear elements, identifying collinear elements that are words;
   identifying a baseline position for each word;
   from the baseline positions of the collinear words, identifying a common curvilinear baseline for each of the plurality of lines;
   identifying a generally vertical line, wherein the generally vertical line is perpendicular to a maximum number of the common curvilinear baselines and closest to a binding edge in the scanned image of the page;
   selecting a starting point in the scanned image, wherein the starting point is located at a midpoint of the generally vertical line; and
   generating, at least partially in a memory of a computer device, a corrected image based on the scanned image, by performing steps including:
   forming a rectilinear horizontal guideline, one for each of the common curvilinear baselines, in the corrected image;
   identifying a starting point in the corrected image at a same horizontal location as that of the starting point in the scanned image; and
   moving left and right from the respective starting points, copying black dots and white dots from the scanned image of the page to the corrected image, wherein the copying of each dot is placed in a same location on or near a rectilinear horizontal guideline as that of the respective curvilinear baseline for each of the plurality of lines.

2. The method of claim 1, wherein copying the black dots and white dots includes copying collinear words on the common curvilinear baselines in the scanned image to a respective location on or near a respective rectilinear horizontal guideline in the corrected image.

3. The method of claim 1, wherein selecting the start point in the scanned image comprises selecting a point in the scanned image which is free of distortion.

4. The method of claim 1, wherein copying collinear words on the common curvilinear baselines in the scanned image includes copying words to the corrected image using the first and second start points as reference points.

5. A system comprising:
a processor; and
a memory coupled to the processor, the memory storing instructions which when executed by the processor cause the system to perform a method for correcting distortions in a scanned image of a page, the method comprising:
  detecting one or more areas of distortion in the scanned image of the page;
  identifying at least one set of collinear elements outside of the one or more areas of distortion in each of a plurality of lines in the scanned image;
  from the collinear elements, identifying collinear elements that are words;
  identifying a baseline position for each word,
  from the baseline positions of the collinear words, identifying a common curvilinear baseline for each of the plurality of lines;
  identifying a generally vertical line, wherein the generally vertical line is perpendicular to a maximum number of the common curvilinear baselines and closest to a binding edge in the scanned image of the page;
  selecting a starting point in the scanned image; and
  generating a corrected image based on the scanned image by performing steams including:
    forming a rectilinear horizontal guideline, one for each of the common curvilinear baselines, in the corrected image;
    identifying a starting point in the corrected image at a same horizontal location as that of the starting point in the scanned image; and
    moving left and right from the respective starting points, copying the black dots and white dots from the scanned image of the page to the corrected image, wherein the copying of each dot is placed in a same location on or near a rectilinear horizontal guideline as that of the respective curvilinear baseline for each of the plurality of lines.

6. The system of claim 5, wherein copying the black dots and white dots includes copying collinear words on the common curvilinear baselines in the scanned image to a respective location on or near a respective rectilinear horizontal guideline in the corrected image.

7. The system of claim 5, wherein selecting the start point comprises selecting a point in the scanned image which is free of distortion.

8. The system of claim 5, wherein the start point is a midpoint of the generally vertical line.

9. A computer-readable medium having stored thereon instructions, which when executed by a processing system, cause the system to perform a method for correcting distortions in a scanned image of a page, the method comprising:
  detecting one or more areas of distortion in the scanned image of the page;
  identifying at least one set of collinear elements outside of the one or more areas of distortion in each of a plurality of lines in the scanned image;
  from the collinear elements, identifying collinear elements that are words;
  identifying a baseline position for each word;
  from the baseline positions of the collinear words, identifying a common curvilinear baseline for each of the plurality of lines;
  identifying a generally vertical line, wherein the generally vertical line is perpendicular to a maximum number of the common curvilinear baselines and closest to a binding edge in the scanned image of the page;
  selecting a starting point in the scanned image; and
  generating a corrected image based on the scanned image by performing steps including:
    forming a rectilinear horizontal guideline, one for each of the common curvilinear baselines, in the corrected image;
    identifying a starting point in the corrected image at a same horizontal location as in that of the starting point in the scanned image; and
    moving left and right from the respective starting points, copying the black dots and white dots from the scanned image of the page to the corrected image, wherein the copying of each dot is placed in a same location on or near a rectilinear horizontal guideline as that of the respective curvilinear baseline for each of the plurality of lines.

10. The computer-readable medium of claim 9, wherein copying the black dots and white dots includes copying collinear words on the common curvilinear baselines in the scanned image to a respective location on or near a respective rectilinear horizontal guideline in the corrected image.

* * * * *